(12) United States Patent
Aiba

(10) Patent No.: US 9,398,184 B2
(45) Date of Patent: Jul. 19, 2016

(54) IMAGE FORMING APPARATUS THAT MAINTAINS COMPATIBILITY OF RESPONSE DATA IN NORMAL MODE AND STANDBY MODE, AND NETWORK RESPONDING METHOD

(71) Applicant: KYOCERA Document Solutions Inc., Osaka (JP)

(72) Inventor: Masaaki Aiba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/720,768

(22) Filed: May 23, 2015

(65) Prior Publication Data

US 2015/0341517 A1    Nov. 26, 2015

(30) Foreign Application Priority Data

May 23, 2014   (JP) .................................. 2014-107352

(51) Int. Cl.
*H04N 1/00* (2006.01)
*H04N 1/32* (2006.01)

(52) U.S. Cl.
CPC ....... *H04N 1/00896* (2013.01); *H04N 1/00204* (2013.01); *H04N 1/00928* (2013.01); *H04N 1/32101* (2013.01); *H04N 1/32496* (2013.01); *H04N 2201/0094* (2013.01)

(58) Field of Classification Search
CPC .......... H04N 1/00896; H04N 1/32496; H04N 1/00928; H04N 1/00204; H04N 1/32101; H04N 2201/0094

USPC ............................................... 358/1.13, 1.15
See application file for complete search history.

(56) References Cited

U.S. PATENT DOCUMENTS

2002/0089692 A1 *  7/2002  Ferlitsch ................. G06F 3/121
                                                    358/1.15

FOREIGN PATENT DOCUMENTS

JP            2010-094925 A       4/2010

* cited by examiner

*Primary Examiner* — Kent Yip
(74) *Attorney, Agent, or Firm* — Hawaii Patent Services; Nathaniel K. Fedde; Kenton N. Fedde

(57) ABSTRACT

Provided is a responding apparatus that receives information request data from a network in a normal mode and in a standby mode. The normal mode response data making part makes response data in the normal mode. In the normal mode, the response data information accumulating part accumulates the information of the made response data in the memory part. The response data information accumulating part sets changing information associated with changing, when the information of the accumulated response data is changed. When shifting from the normal mode to the standby mode, a changed response data making part requests information of the changed response data to the normal mode response data making part. In the standby mode, the standby mode response data making part makes response data by using the information of the made response data and the information of the accumulated response data.

4 Claims, 12 Drawing Sheets

FIG. 3A

| ITEM | DATA |
|---|---|
| ETHERNET ADDRESS | 00:C0:EE:AE:AB:C8 |
| IP ADDRESS | 192.168.0.123 |

| OID | DATA | | CHANGING INFORMATION |
|---|---|---|---|
| | TYPE | DATA VALUE | |
| 1.3.6.1.2.1.2.2.1.1.1 | INTEGER | 1 | 1 |
| 1.3.6.1.2.1.2.2.1.2.1 | STRING | eth0 | 0 |
| 1.3.6.1.2.1.2.2.1.3.1 | INTEGER | 6 | 1 |
| 1.3.6.1.2.1.2.2.1.4.1 | INTEGER | 1500 | 0 |
| 1.3.6.1.2.1.2.2.1.5.1 | Gauge32 | 0 | 0 |
| 1.3.6.1.2.1.2.2.1.6.1 | Hex-STRING | 00 C0 EE AE AB C8 | 0 |
| ... | ... | ... | ... |

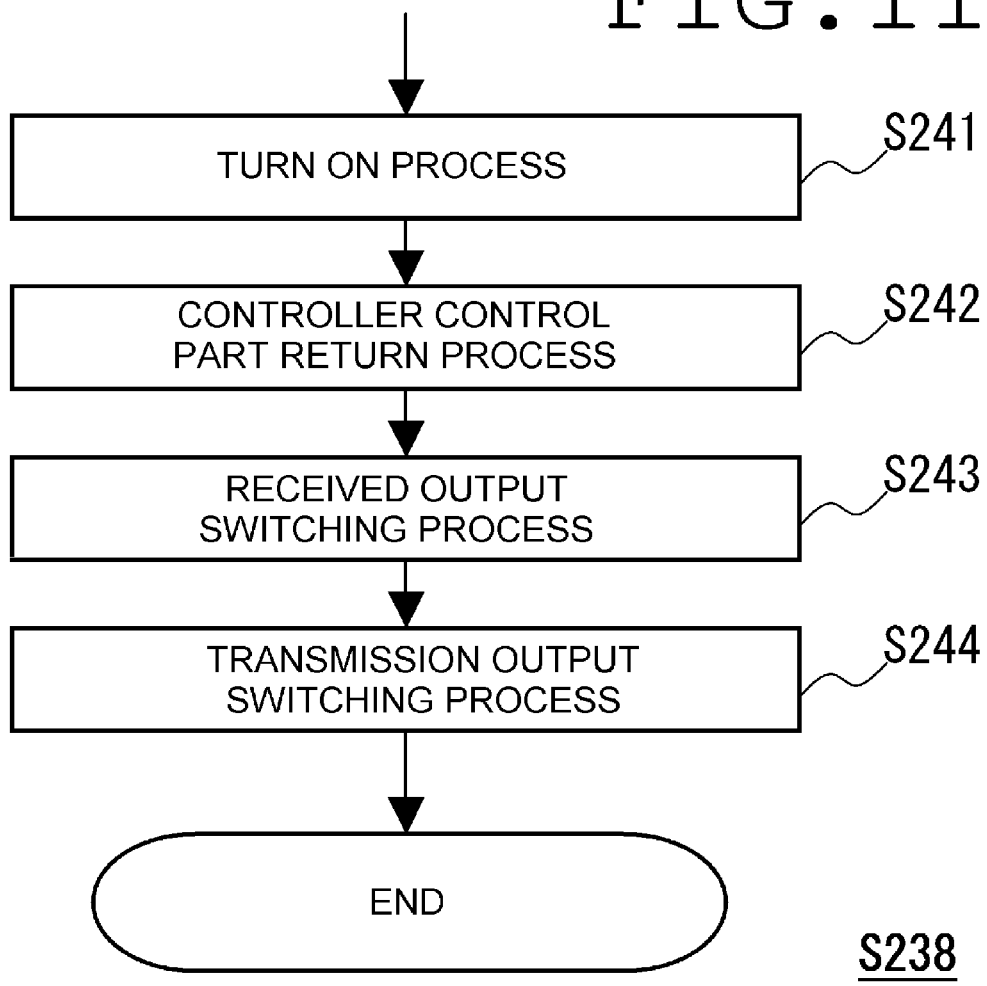

IMAGE FORMING APPARATUS THAT MAINTAINS COMPATIBILITY OF RESPONSE DATA IN NORMAL MODE AND STANDBY MODE, AND NETWORK RESPONDING METHOD

INCORPORATION BY REFERENCE

This application is based on and claims the benefit of priority from Japanese Patent Application No. 2014-107352 filed on May 23, 2014, the contents of which are hereby incorporated by reference.

BACKGROUND

The present disclosure relates to a responding apparatus and a network responding method, especially, it is related with a responding apparatus and a network responding method that receives information request data and transmits response data to information request data.

An image forming apparatus is an MFP (Multifunctional Peripheral, MFP) or the like, that can print a document and an image.

The image forming apparatus, as energy conservation measures, when set-up time passes in a state where a user does not use, shifts to the waiting state of low power, which electric power to each part that has large power consumption is stopped and electric power to only a part that has a function is supplied (henceforth a "standby mode.")

However, once it shifts to a standby mode, it needs time until a state where a user can use the image forming apparatus (henceforth "normal mode.")

For example, when a host computer transmits information request data for confirming information of an image forming apparatus via a network to the image forming apparatus, which is in the standby mode, since the image forming apparatus shifts from the standby mode to the normal mode and transmits response data, it requires time. Accordingly, when information request data is transmitted from the host computer repeatedly, since number of times of shifting from the standby mode to the normal mode increases in addition that time in the standby mode becomes short, power consumption cannot be cut down, efficiently.

As this measure, for example, in a typical technology, an image processing device that includes a controller having two CPUs (Central Processing Unit), which are main CPU for responding in the normal mode and sub CPU for responding in the standby mode, and, in normal mode, the main CPU memorizes response data to RAM (Random Access Memory) for the main CPU is disclosed. For such an image forming apparatus, when shifting to the standby mode, by sub CPU, frequently-used response data is extracted from RAM for the main CPU, and the main CPU memorizes it to RAM for sub CPU. Thus, since frequently-used response data is memorized in RAM for sub CPU when it shifts from the normal mode to the standby mode, response data can be made and transmit in the standby mode by using the data that sub CPU memorized in RAM for sub CPU.

SUMMARY

A responding apparatus of the present disclosure receives information request data from a network in a normal mode and a standby mode. Also, the responding apparatus allows for transmitting response data to the information request data to the network. Also, the responding apparatus includes a normal mode response data making part, a response data information accumulating part, a changed response data making request part, and a standby mode response data making part. The normal mode response data making part makes the response data in the normal mode. The response data information accumulating part accumulates, in the normal mode, information of the response data made by the normal mode response data making part in a memory part that can be read in the standby mode, and when the information of the accumulated response data is changed, sets changing information associated with change. The changed response data making request part, when shifting from the normal mode to the standby mode, refers the changing information set by the information accumulating part and making requests information of changed response data to the normal mode response data making part. The standby mode response data making part that makes the response data in the standby mode with information of the response data made for the making request by the changed response data making request part and information of the response data accumulated in the memory part by the response data information accumulating part.

A network responding method of the present disclosure is for receiving information request data from a network in a normal mode and a standby mode. The network responding method is executed by a responding apparatus that can transmit response data to the information request data to the network. In the network responding method, the response data is made in the normal mode. Also, in the normal mode, information of made response data is accumulated in a memory part that can be read in the standby mode. Also, when the information of the accumulated response data is changed, the changing information associated with changed is set. Also, when shifting from the normal mode to the standby mode, accumulated changing information is referred. Also, information of the changed response data is making requested. Also, in the standby mode, the response data is made with information of the response data made for the making request and information of the response data accumulated in the memory part.

BRIEF DESCRIPTION OF THE DRAWINGS

FIG. 3A is a table figure illustrating a configuration of address information of the responding apparatus shown in FIG. 1;

FIG. 3B is a table figure illustrating the configuration of SNMP response information and changing information of the responding apparatus shown in FIG. 1;

FIG. 11 is a flow chart that illustrates details of the normal mode shifting process shown in FIG. 9.

DETAILED DESCRIPTION

Embodiment

The Configuration of Response System X

Figure 1:
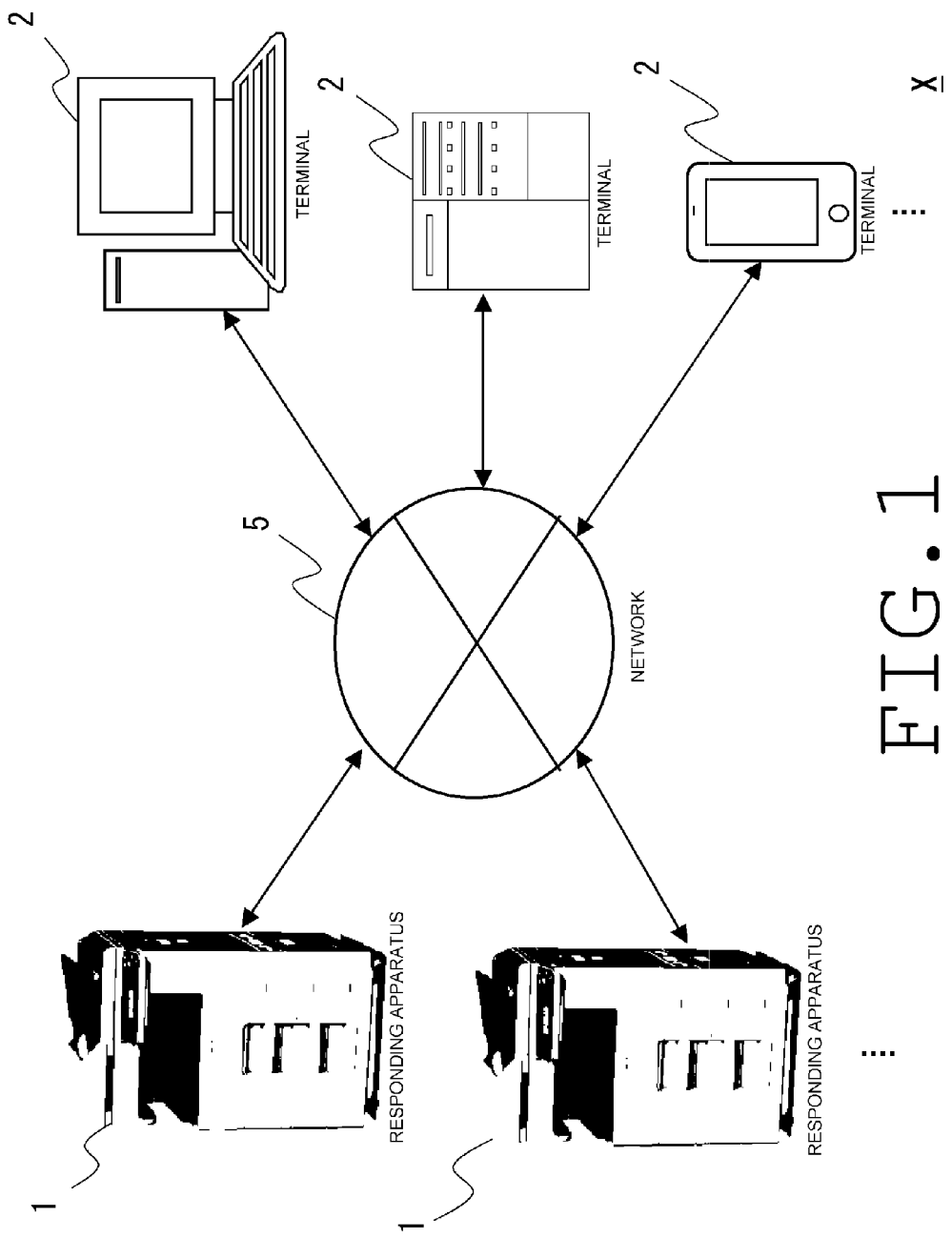
FIG. 1 is a system configuration diagram of a response system of the present disclosure.

First, referring to FIG. 1, the configuration of response system X related to the embodiment of the present disclosure is described.

Response system X includes responding apparatus 1 and terminal 2, and responding apparatus 1 and terminal 2 are connected with network 5.

Responding apparatus 1 is an apparatus for others that receives information request data 131 via an image forming apparatus or network 5 and transmits response data 132 to information request data 131. In the present embodiment, for example, responding apparatus 1 may have function of an SNMP (Simple Network Management Protocol) agent.

Terminal 2 transmits information request data 131 to responding apparatus 1 and receives response data 132 to information request data 131. Terminal 2 may have function of an SNMP manager.

Network 5 is an external network. For example, network 5 can transmit and receive a TCP/IP packet.

[The Control Configuration of Responding Apparatus 1]

Figure 2:
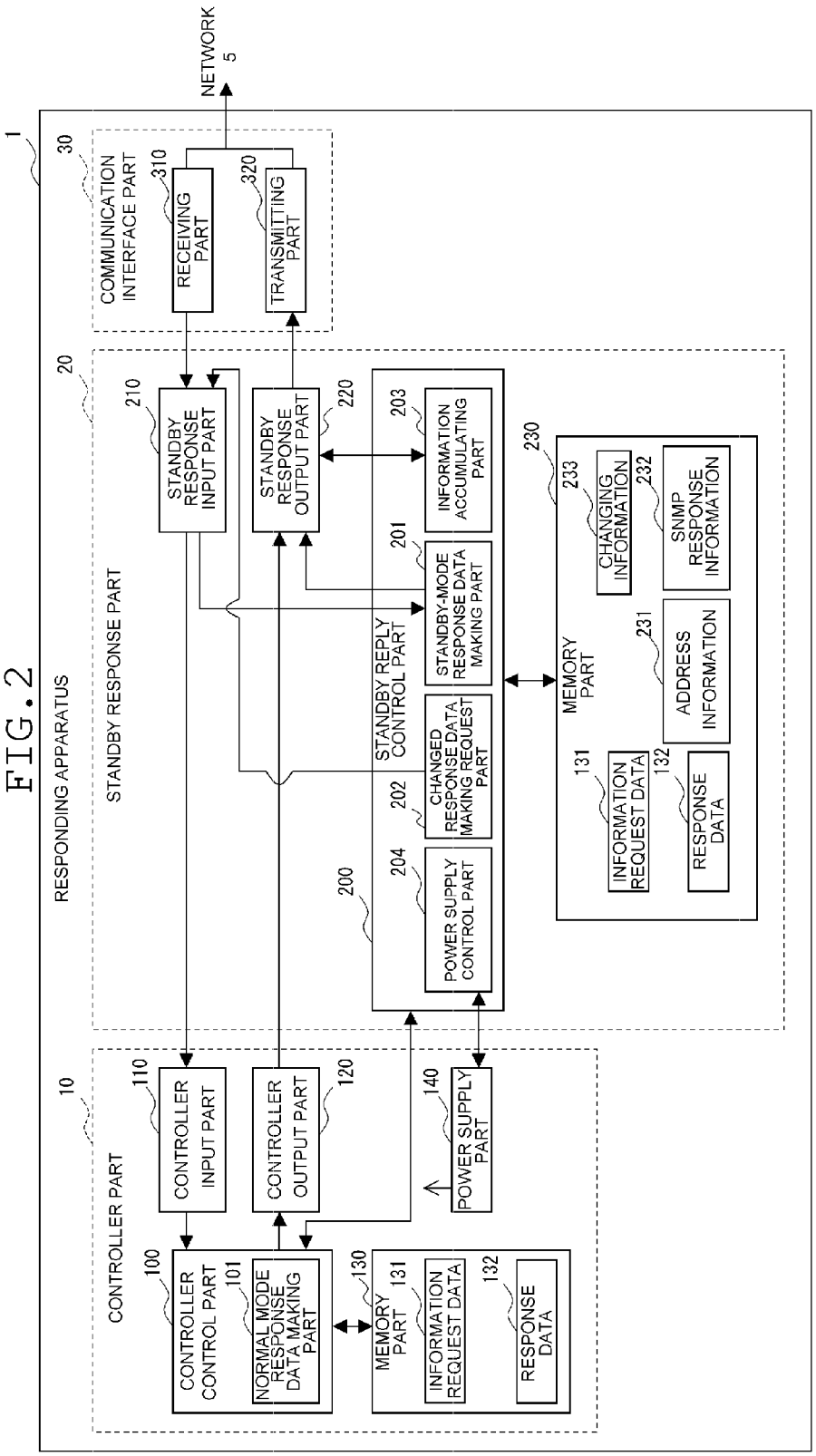
FIG. 2 is a block diagram illustrating a control configuration of the responding apparatus related to the embodiment of the image forming apparatus of the present disclosure.

Next, referring to FIG. 2, a control configuration of responding apparatus 1 is described.

Responding apparatus 1 related to the embodiment of the present disclosure includes controller part 10, standby response part 20, and communication interface part 30. Each part is connected with network 5 via communication interface part 30.

(Configuration of Controller Part 10)

Controller part 10 is a host controller having a main board that controls each part of an image forming apparatus, or the like, and a function of a network card, or the like. Controller part 10 includes controller control part 100, controller input part 110, controller output part 120, memory part 130, and power supply part 140.

Controller part 10, when responding apparatus 1 is in the normal mode, inputs information request data 131 and outputs response data 132. Accordingly, in controller part 10, controller control part 100 processes a receive packet received by controller input part 110 and transmits a response packet to controller output part 120.

Controller control part 100 is an information processing part. Also, controller control part 100 includes normal mode response data making part 101. The details of the normal mode response data making part 101 are described later.

Controller control part 100 reads control program memorized in memory part 130, expands this control program, and executes it. Thereby, controller control part 100 is operated as each part of a functional block described later.

Controller control part 100 is, for example, possible to function as an SNMP Agent. Also, controller control part 100 controls whole devices, such as an image forming apparatus, according to specified instructions information input from an external terminal or an operation panel part that are not shown.

Controller input part 110 outputs the packet received from standby response part 20 to controller control part 100. In other words, controller control part 100 inputs information request data 131 output from standby response part 20 via controller input part 110. As explained in more detail, controller input part 110 inputs information request data 131 that is input from receiving part 310 in communication interface part 30 and is output from standby response part 20.

Also, in addition to this, controller input part 110 inputs information request data 131 that is recursively transmitted from changed response data making request part 202 as described later and is output from standby response part 20.

Controller output part 120 outputs the packet made by controller control part 100 to standby response part 20. As explained in detail, controller output part 120 outputs response data 132 to standby response part 20.

Memory part 130 is a non-transitory recording medium. Also, memory part 130 memorizes information request data 131 and response data 132.

Even if memory part 130 is in the state of the standby mode, a memory content is kept by function, such as self refreshing. Also, a control program for operation controlling to responding apparatus 1 is memorized in memory part 130. In addition, memory part 130 may also memorize an account setup for a user. Also, an area of a storage folder for each user may be included in memory part 130.

In addition, in the standby mode, memory part 130 may not be possible reading and writing from standby response part 20.

Power supply part 140 supplies a power to each part including controller control part 100 in controller part 10. Also, power supply part 140 controls power supply of controller control part 100 in response to input from power supply standby reply control part 200 in standby response part 20. Power supply part 140, by control from standby response part 20, when power supply is turned ON, supplies electric power to each part or, when it is turned OFF, stops the electric power to each part.

Normal mode response data making part 101 makes response data 132 in the normal mode. Normal mode response data making part 101 is temporarily stores information request data 131 in memory part 130, when information request data 131 is acquired from controller input part 110.

Normal mode response data making part 101 refers the information request data 131, if a response is needed, makes response data 132, and outputs it to controller output part 120. In this case, information that serves as a basis to make response data 132 may be changed by changing an equipment state, or the like.

Also, normal mode response data making part 101 shifts from the normal mode to the standby mode if it becomes a condition set in memory part 130. Normal mode response data making part 101, as the set condition, for example, when time set by a timer, which is not illustrated, has passed after having not detected an instruction by a user, shifts from the normal mode to the standby mode. As the condition having not detected the instruction by the user, for example, a condition can be set that set-up time passes without receiving print data after a user touches an operation panel lastly, or the like.

Here, controller control part 100 in responding apparatus 1 functions as normal mode response data making part 101 by executing the control program memorized in memory part 130.

Information request data 131 is data for requesting variety of information for responding apparatus 1 by various protocols. Information request data 131 is acquired from controller input part 110 and is temporarily memorized in the normal mode response data making part 101.

Information request data 131, may be data including a packet of various request, such as ARP (Address Resolution Protocol) request, RARP (Reverse address resolution protocol,) DHCP (Dynamic Host Configuration Protocol,) BOOTP (Bootstrap Protocol), or the like.

Also, information request data 131 may include data of a packet for the various requests, such as "SNMP-Get request", "SNMP-GetNext request", or the like, which has OID (Object IDentifier) of SNMP.

Response data 132 is data for performing a response to information request data 131 according to the various protocols. Response data 132 is made by normal mode response data making part 101 and is output to controller output part 120.

Response data 132, for example, may be an IP address or a MAC address of responding apparatus 1 if information request data 131 is an ARP request or an RARP request.

Also, response data 132, for example, if information request data 131 is the various requests of SNMP, may be included data of a message for a response of a "SNMP-Get response", "TRAP", or the like, which is made with referencing OID about MIB (Management Information Base) of responding apparatus 1.

(Configuration of Standby Response Part 20)

Standby response part 20 is a circuit for a standby response including an ASIC, or the like, which performs the standby response to network 5 when responding apparatus 1 is in the standby mode. Standby response part 20 includes standby reply control part 200, standby response input part 210, standby response output part 220, and memory part 230. Each part is connected by various bus.

Standby response part 20, in the standby mode, inputs information request data 131 from communication interface part 30 and outputs response data 132 to communication interface part 30.

Standby reply control part 200 has a control part, such as GPP, MPU, or CPU. Also, standby reply control part 200 includes standby mode response data making part 201, changed response data making request part 202, information accumulating part 203, and power supply control part 204. The details of these each part are described later.

Standby reply control part 200 is connected to standby response input part 210, standby response output part 220, and memory part 230, and it controls each part. Also, power consumption of standby reply control part 200 may be less than that of controller control part 100 in controller part 10.

Standby response input part 210 outputs a packet input from communication interface part 30 or changed response data making request part 202 to controller part 10 or standby mode response data making part 201 in standby reply control part 200. Also, standby response input part 210 inputs information request data 131 output from communication interface part 30.

Standby response output part 220 outputs a packet input from controller part 10 or standby mode response data making part 201 in standby reply control part 200 to information accumulating part 203 or communication interface part 30. Also, standby response output part 220 outputs response data 132 to communication interface part 30 or information accumulating part 203 in standby reply control part 200.

Memory part 230 is a non-transitory recording medium. Storage capacity of memory part 230 may be less than that of memory part 130 in controller part 10.

In addition, memory part 230 may be built in standby reply control part 200. Also, only about the program that standby reply control part 200 executes and data may be memorized in ROM, or the like, built in standby reply control part 200.

Standby-mode response data making part 201 makes response data 132 from information of SNMP response information 232, or the like, accumulated in memory part 230 by information accumulating part 203 when responding apparatus 1 is in the standby mode.

Standby-mode response data making part 201 makes the response for the packet input from standby response input part 210 by using data in memory part 230.

Specifically, standby mode response data making part 201 makes response data 132, for example, for received ARP request or RARP request by using address information 231 in memory part 230.

Also, standby mode response data making part 201 makes response data 132, for example, for received SNMP-GET request by using SNMP response information 232.

In addition, standby mode response data making part 201, if storage capacity of memory part 230 is not enough and cannot make response data 132, controller part 10 is returned. Accordingly, standby mode response data making part 201 makes a return instruction notify from power supply control part 204 to power supply part 140.

Changed response data making request part 202, when shifting from the normal mode to the standby mode, refers changing information 233 accumulated by information accumulating part 203. If there is changed SNMP response information 232, changed response data making request part 202 transmits information request data 131 that requests this SNMP response information 232 to normal mode response data making part 101 (Hereinafter, it is called a "making request".). Thus, changed response data making request part 202 may make information request data 131 including a packet of the SNMP-Get request and input to standby response input part 210.

Also, changed response data making request part 202, if response data 132 including information of specific type is made by normal mode response data making part 101 as corresponded to information request data 131 from outside, may request information of the other response data 132.

Also, changed response data making request part 202 may detect the IP address and the MAC Address are memorized in address information 231 by information accumulating part 203 and may make data of MIB of SNMP transmit recursively from controller part 10.

Information accumulating part 203 accumulates information of response data 132, which is output to communication interface part 30, from controller part 10 via standby response output part 220.

Also, information accumulating part 203 accumulates information of response data 132 made by normal mode response data making part 101 in the normal mode in memory part 230, which can be read in the standby mode, as address information 231 and SNMP response information 232.

Also, information accumulating part 203, if the information of response data 132 is changed by normal mode response data making part 101, changes address information 231 and SNMP response information 232 by using information of the response data 132 and sets changing information 233 associated with address information 231 and SNMP response information 232 in memory part 230.

Also, information accumulating part 203, when shifting from the normal mode to the standby mode, accumulates information of response data 132 made by normal mode response data making part 101 as corresponded to information request data 131 recursively transmitted by changed response data making request part 202. Accordingly, information accumulating part 203 acquires and analyzes the packet output from standby response output part 220, and it memorizes needed information in memory part 230.

In detail, information accumulating part 203, if the packet of ARP or RARP is input, sets and memorizes an IP address and a MAC Address in address information 231.
Similarly, information accumulating part 203 memorizes OID and response data 132 to SNMP response information 232 when an SNMP response packet is input. In this case, information accumulating part 203 makes information associated with the OID in changing information 233 (henceforth an "entry") and sets "0," or the like, which is an initial state for generation. Also, information accumulating part 203, if information of response data 132 is changed by normal mode response data making part 101, for example, as corresponded to change of equipment states, such as changing output number of pages or reducing of quantity of a toner, detects the change and sets "1," or the like, which indicates a state of being changed, to the entry of changing information 233 associated with OID of response data 132. Thereby, information accumulating part 203 can store at least a part of MIB of SNMP for responding apparatus 1 in SNMP response information 232. Also, even if the equipment state is changed and response data 132 is changed by normal mode response data making parts 101, at least a part is reflected to SNMP response information 232. Accordingly, it becomes possible to respond appropriately in the standby mode as corresponded to the latest status of the normal mode.

In addition, if information accumulating part 203 acquires the specific type of information, it can notify that effect to changed response data making request part 202. For example, when an ARP and an RARP packet are input and information accumulating part 203 memorizes an IP address and a MAC Address in address information 231 for the first time, information accumulating part 203 notify that effect to changed response data making request part 202 in standby reply control part 200 (hereafter, this notice is called "notice of address memory".).

Power supply control part 204 controls power supply part 140 in controller part 10 to turn ON or OFF.

At the shifting time from the normal mode to the standby mode, power supply control part 204 turns OFF power supply part 140 in controller part 10 and makes a process of standby response part 20 in the standby mode to start.

Also, when power supply control part 204 receives a instruction for shifting to the normal mode from standby mode response data making part 201, it turns ON power supply part 140.

Thereby, power supply control part 204 returns the power supply of controller part 10 via power supply part 140 and makes the process of normal mode start.

Here, standby reply control part 200 in responding apparatus 1 executes the control program memorized in memory part 230 and functions as standby mode response data making part 201, changed response data making request part 202, information accumulating part 203, and power supply control part 204.

Memory part 230 memorizes information request data 131, response data 132, address information 231, SNMP response information 232, and changing information 233. Configurations of address information 231, SNMP response information 232, and changing information 233 are described later.

In addition, SNMP response information 232 may not need to be set up information at the time of start of responding apparatus 1. Also, changing information 233 may be memorized in a non-transitory recording medium accessible only in the normal mode. Accordingly, cost can be reduced.

(Configuration of Communication Interface Part 30)

Communication interface part 30 is an interface of the physical layer that converts a logic signal into an actual electric signal in an interface of Ethernet (registered trademark,) or the like. Communication interface part 30 may be a removable LAN interface for adapting and connecting to network 5.

Communication interface part 30 has receiving part 310 and transmitting part 320.

Receiving part 310 outputs data of an Ethernet (registered trademark) frame or a packet received from network 5, or the like, (hereafter, it is solely called a "packet") to standby response part 20. In other words, when receiving part 310 receives the packet of information request data 131 transmitted from terminal 2, it makes information request data 131 output to standby response part 20.

Transmitting part 320 transmits the packet output from standby response part 20 to network 5. In detail, when response data 132 is input from standby response part 20, transmitting part 320 transmits the packet of response data 132 to terminal 2.

Here, each part of above-mentioned responding apparatus 1 serves as hardware resources that execute the network responding method of the present disclosure.

(Detailed Configuration of Address Information 231, SNMP Response Information 232, and Changing information 233)

Next, referring to FIG. 3A and FIG. 3B, a configuration of address information 231 and SNMP response information 232, which are memorized in memory part 230 in standby response part 20, is described.

Firstly, a configuration of address information 231 shown in FIG. 3A is explained. Address information 231 is a table that memorizes an IP address and a MAC Address of responding apparatus 1.

When it explains in detail, address information 231 has items of "IP address" and "MAC Address (Ethernet address)."

In "IP address," IP address of responding apparatus 1, which is set to response data 132, is acquired by information accumulating part 203 and is stored.

In "MAC Address," the MAC Address corresponding to the IP address of responding apparatus 1, which is set to response data 132, is acquired by information accumulating part 203 and is stored.

Next, the configuration of SNMP response information 232 and changing information 233 shown in FIG. 3B is explained. SNMP response information 232 is a table for storing MIB used for response data 132 of SNMP of controller part 10, or the like, and memorizes OID and response data 132.

In SNMP response information 232, the information of response data 132 to information request data 131 of SNMP is accumulated. SNMP response information 232 has items of "OID" and "data." At "OID," it stores an identifier attached in order to distinguish an object of each management information stored in MIB (Management information base) of SNMP. At "Data," it stores data to "OID" set in response data 132. At "Data," there are items of "type" and "data value." At "type," a type of "data value" is stored. For example, if the type of "data value" is an integer, "INTEGER" is stored; and if a type is a character string, a value of "STRING" is stored. At "data value," an actual data value is stored. SNMP response information 232 may be memorized as a tree form structure.

Changing information 233 is information that shows the data of SNMP response information 232 is changed (updated) or not. For example, changing information 233 is set a value as like "0" if the data corresponding to each OID of SNMP response information 232 has not been changed (not updated)

since the time of storage (accumulation) and is set a value as like "1" if changed (updated) by information accumulating part 203. In addition, changing information 233 may also be set information of change that indicates address information 231 is changed (updated) or not.

[A Normal Mode Process by Responding Apparatus 1]

Figure 4:
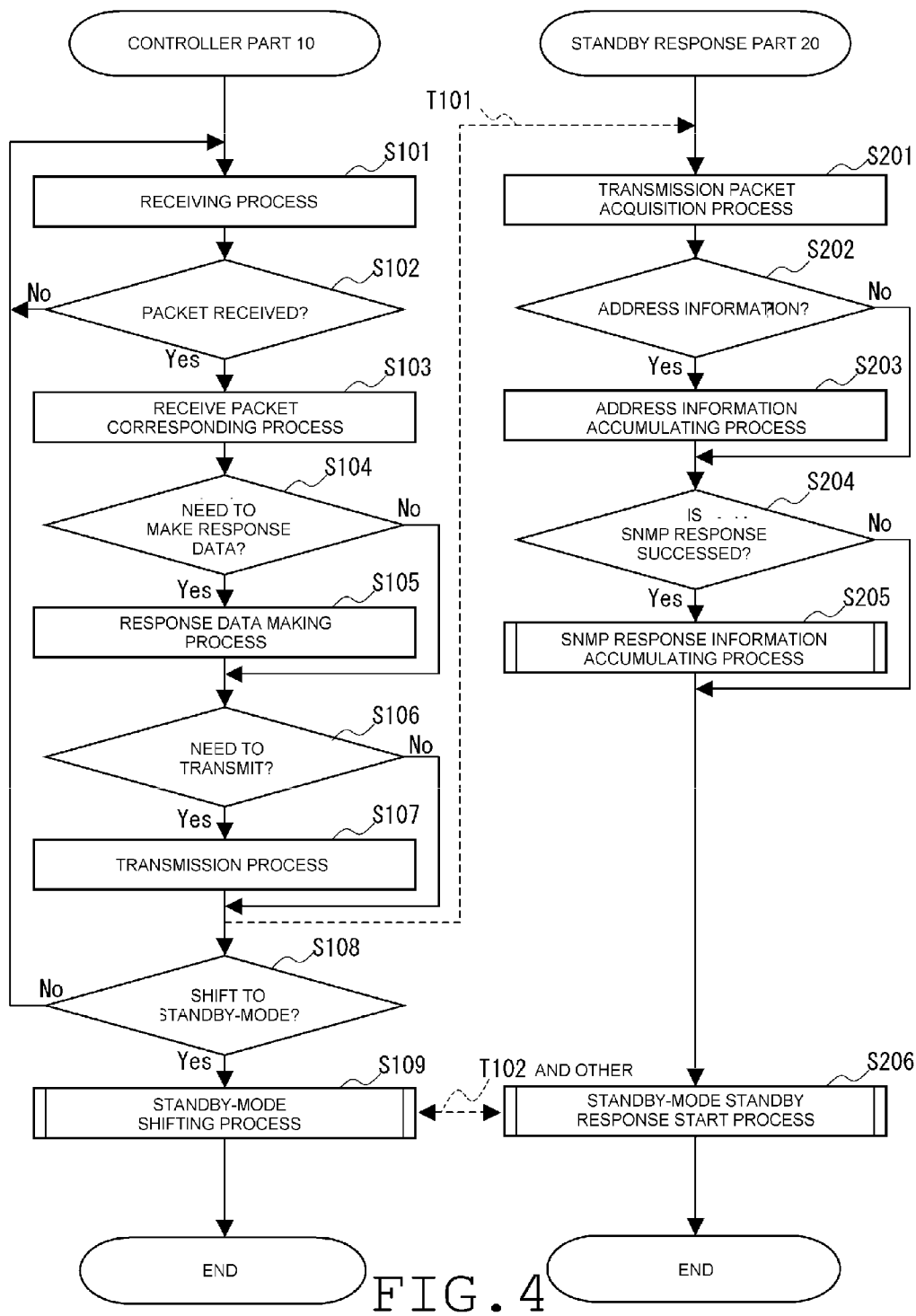
FIG. 4 is a flow chart of a normal mode process of the responding apparatus related to the embodiment of the present disclosure.

Next, with reference to FIG. 4, a normal mode process that is operation in the normal mode by responding apparatus 1 related to the embodiment of the present disclosure is explained.

In the normal mode process of the present embodiment, in the normal mode, for information request data 131, controller part 10 makes response data 132 and responds. In this case, standby response part 20 acquires the transmitted packet, extracts information needed for response in the standby mode, and memorizes it to memory part 230. In detail, when response data 132, which includes an IP address and a MAC Address, or response data 132, which is MIB of SNMP, is transmitted by controller part 10, standby response part 20 acquires and accumulates it. Also, in this case, when response data 132 is changed, standby response part 20 detects it and sets in changing information 233.

In the normal mode process of the present embodiment, mainly, in controller part 10, controller control part 100 reads the program memorized in memory part 130, in standby response part 20, standby reply control part 200 calls the program memorized in memory part 230, collaborates with each part, and executes them by using hardware resources.

In the following, with reference to the flowchart of FIG. 4, the details of the normal mode process are explained for each step.

(Step S101)

Firstly, controller input part 110 performs a receiving process.

Here, at first, when a packet from network 5 is received in receiving part 310 in communication interface part 30, it is input to standby response input part 210 in standby response part 20.

Also, the packet input to standby response input part 210 in communication interface part 30 is input to controller input part 110 in controller part 10.

Controller input part 110 outputs the input packet to controller control part 100.

(Step S102)

Then, controller control part 100 as normal mode response data making part 101 determines that there is any received packet or not. If the packet received in receiving part 310 is input, controller control part 100 determines to Yes. If the other, controller control part 100 determines to No.

In Yes, controller control part 100 advances a process to Step S103.

In No, controller control part 100 returns a process to Step S101, and it waits until receiving a packet.

(Step S103)

If there is the received packet, controller control part 100 as normal mode response data making part 101 performs a receive packet corresponding process.

Controller control part 100 processes the packet input to controller input part 110.

Controller control part 100, if the input packet is a packet that needs for the various control of responding apparatus 1 including image formation, performs a needed process according to the various protocols corresponding to the acquired packet.

Also, if the input packet is information request data 131, controller control part 100 stores this in memory part 130, temporarily.

(Step S104)

Next, controller control part 100 as normal mode response data making part 101 determines whether or not response data 132 is needed to make. If the received packet is information request data 131 and response data 132 is needed to make, controller control part 100 determines to Yes. Also, if it is a packet of a recursive response, controller control part 100 determines to Yes because response data 132 is needed to make. If the other cases, controller control part 100 determines to No.

In Yes, controller control part 100 advances a process to Step S105.

In No, controller control part 100 advances a process to Step S106.

(Step S105)

If response data 132 is needed to make, controller control part 100 as normal mode response data making part 101 performs a response data making process.

Controller control part 100 makes response data 132 corresponding to information request data 131, which is stored temporarily.

In this case, controller control part 100 changes and makes the information of response data 132 if needed. For example, controller control part 100 can make response data 132 corresponding to change of the equipment state, such as changing number of output page, changing toner amount, quantity of paper in a paper cassette, a state of opening and closing of a cover, failing state, paper jam, or the like.

(Step S106)

Here, controller control part 100 as normal mode response data making part 101 determines there is any packet to transmit or not. At first, if response data 132 is made, controller control part 100 determines to Yes. Also, if a needed process is performed with a packet needed for the various control of responding apparatus 1 and the packet to transmit corresponding to various protocols is made, controller control part 100 determines to Yes. If the other case, controller control part 100 determines to No.

In Yes, controller control part 100 advances a process to Step S107.

In No, controller control part 100 advances a process to Step S108.

(Step S107)

If there is a packet to transmit, controller control part 100 as normal mode response data making part 101 performs a transmission process.

Controller control part 100 makes the packet to transmit output from controller output part 120.

Controller output part 120 outputs the packet to transmit to standby response output part 220 in standby response part 20. In that case, the packet to transmit is output to transmitting part 320 in communication interface part 30 by standby response output part 220. Then, the packet to transmit is output to network 5 by transmitting part 320.

Also, the packet to transmit is output from standby response output part 220 to information accumulating part 203 in standby reply control part 200 in standby response part 20 (timing T101).

(Step S201)

Here, after transmitting response data 132, standby reply control part 200 in standby response part 20 as information accumulating part 203 performs transmission packet acquisition process.

Standby reply control part 200 acquires and analyzes the packet to transmit from standby response output part 220.

(Step S202)

Then, standby reply control part 200 as information accumulating part 203 determines whether or not the acquired packet is address information. If the acquired packet is the packet of response data 132, such as ARP and RARP, standby reply control part 200 determines to Yes. If the other case, standby reply control part 200 determines to No.

In Yes, standby reply control part 200 advances a process to Step S203.

In No, standby reply control part 200 advances a process to Step S204.

(Step S203)

If the acquired packet is the packet of response data 132, such as ARP and RARP, standby reply control part 200 as information accumulating part 203 performs address information accumulation process.

Figure 5:
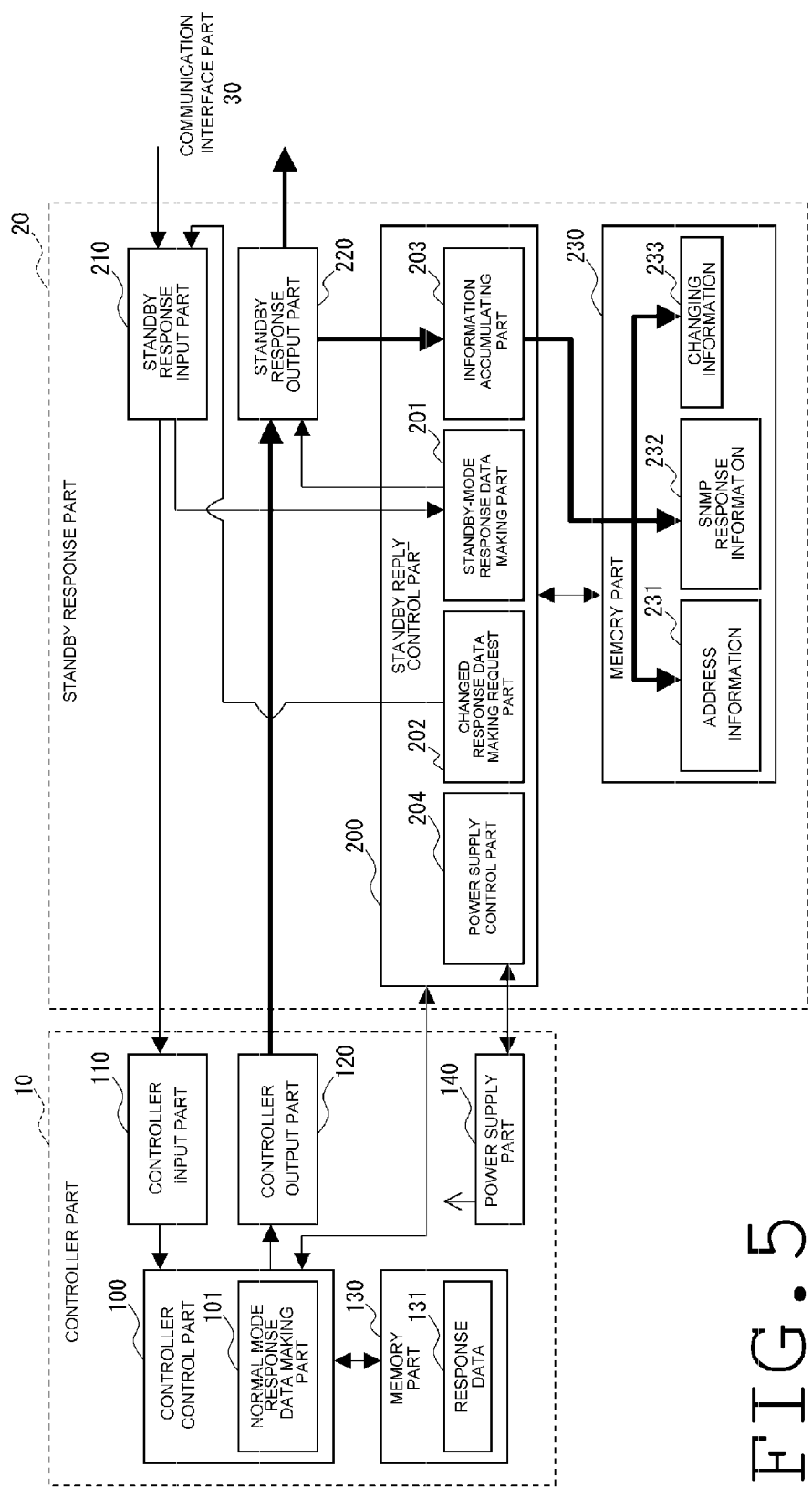
FIG. 5 is a conceptual diagram of address information accumulating process and SNMP response information accumulating process showing in FIG. 4.

According to FIG. 5, standby reply control part 200 memorizes the IP address and the MAC Address of the transmission source of the packet in address information 231 of memory part 230. That is, the IP address and the MAC Address of responding apparatus 1 are stored in address information 231.

(Step S204)

Here, standby reply control part 200 as information accumulating part 203 determines whether or not acquired packet is a response of SNMP and the response is successful. If the acquired packet is response data 132 for a SNMP-Get response or a TRAP response and is normal status, or the like, standby reply control part 200 determines to Yes. If the other cases, standby reply control part 200 determines to No.

In Yes, standby reply control part 200 advances a process to Step S205.

In No, standby reply control part 200 advances a process to Step S206.

(Step S205)

If it is the response of SNMP and is succeeded, standby reply control part 200 as information accumulating part 203 performs SNMP response information accumulation process.

The details of this process are described later.

Then, standby reply control part 200 in standby response part 20 is waiting until controller part 10 shifts to the standby mode.

(Step S108)

Once more, the process of controller part 10 is explained.

Here, controller control part 100 in controller part 10 as normal mode response data making part 101 determines whether or not to shift to the standby mode. If it becomes a set condition, controller control part 100 determines to Yes. If the other cases, controller control part 100 determines to No.

In Yes, controller control part 100 advances a process to Step S109.

In No, controller control part 100 returns a process to Step S101 and continues various process including the process of the host controller.

(Step S109)

If shifting to the standby mode, controller control part 100 as normal mode response data making part 101 performs standby mode shifting process.

Controller control part 100 transmits the standby mode shifting notice to standby response part 20 in this case (timing T102.)

The details of this standby mode shifting process are described later.

Accordingly, the process of controller part 10 in the normal mode process is ended.

(Step S206)

Once more, the process of standby response part 20 is explained.

When standby reply control part 200 in standby response part 20 receives the standby mode shifting notice, it performs a standby mode standby response start process as power supply control part 204.

Standby reply control part 200 starts the process in the standby mode in standby response part 20.

The details of this standby mode standby response start process is also described later.

Then, standby reply control part 200 ends the process by standby response part 20 in the normal mode process.

By the above-mentioned, the normal mode process related to the embodiment of the present disclosure is ended.

Figure 6:
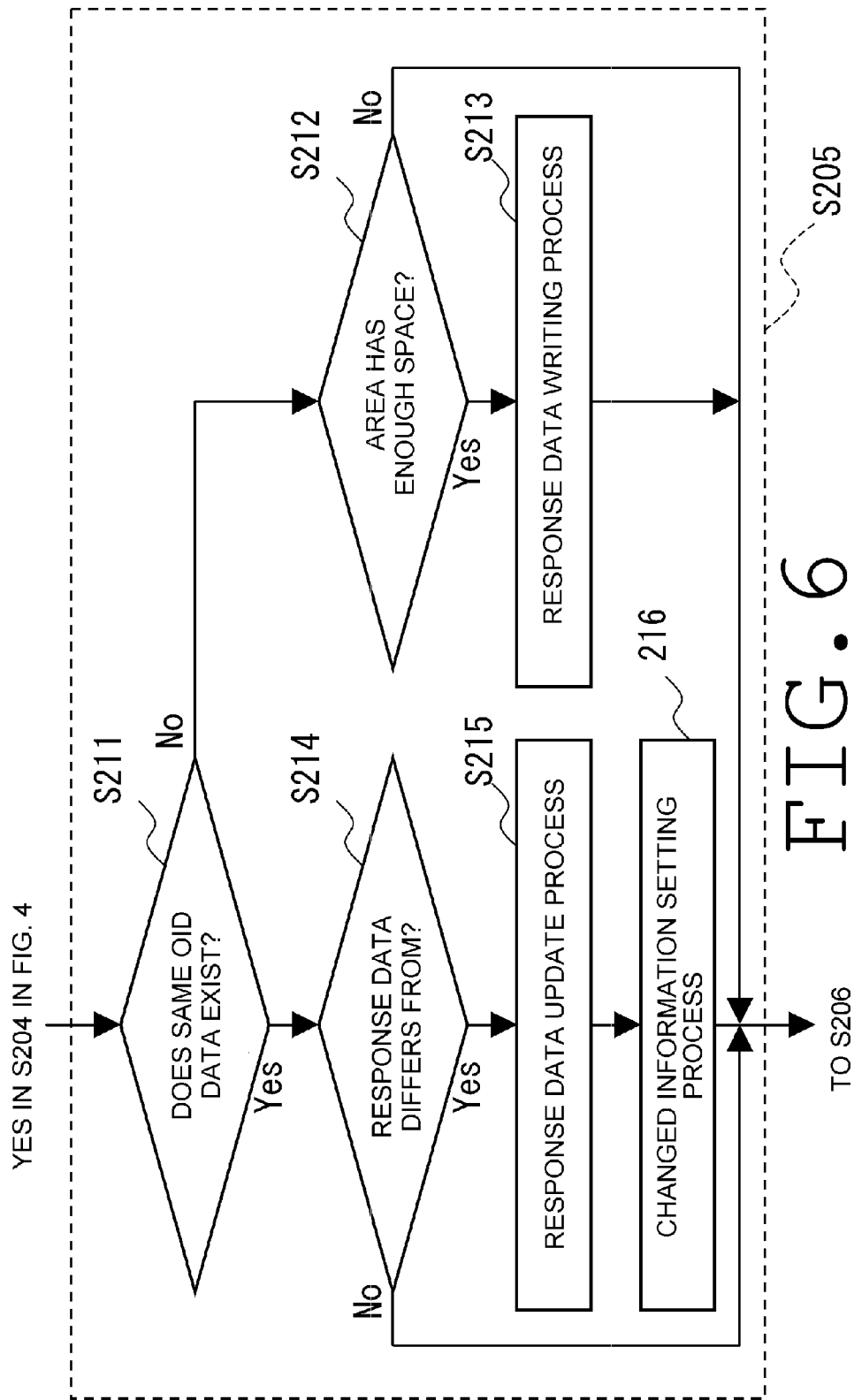
FIG. 6 is a flow chart that illustrates details of the SNMP response information accumulating process shown in FIG. 4.

Next, as refer to FIG. 6, the details of the SNMP response information accumulating process of Step S205 in FIG. 4 are explained.

(Step S211)

If it is Yes in Step S204 shown in FIG. 4, firstly, standby reply control part 200 determines whether or not the data of the acquired packet is already accumulated in memory part 230. Standby reply control part 200 determines whether or not OID of the packet output from standby response output part 220 exists in SNMP response information 232 in memory part 230. If the OID already exists in SNMP response information 232, standby reply control part 200 determines to Yes. If the other case, that is, the OID does not exist in SNMP response information 232, standby reply control part 200 determines to No.

In Yes, standby reply control part 200 advances a process to Step S214.

In No, standby reply control part 200 advances a process to Step S212.

(Step S212)

If the data of the acquired packet is not accumulated, standby reply control part 200 determines whether or not enough space is in the area to memorize SNMP response information 232. If space is enough in the table of SNMP response information 232 in memory part 230, standby reply control part 200 determines to Yes. If there is no space in the table of SNMP response information 232, standby reply control part 200 determines to No.

In Yes, standby reply control part 200 advances a process to Step S213.

In No, standby reply control part 200 ends SNMP response information accumulating process.

(Step S213)

If space is in the area that memorizes SNMP response information 232, standby reply control part 200 performs response data writing process.

Referring to FIG. 5, standby reply control part 200 memorizes OID in the acquired packet and response data 132 in SNMP response information 232.

Also in this case, standby reply control part 200 makes an entry of changing information 233 corresponding to the OID and sets values, such as "0" or the like, which shows a state without changing, as an initial value.

Then, standby reply control part 200 ends SNMP response information accumulating process and advances a process to Step S206 (FIG. 4).

(Step S214)

If the data of the acquired packet is already accumulated, standby reply control part 200 determines whether or not it differs from the data already accumulated in SNMP response information 232. If it is detected that the type and/or data value in response data 132 of the acquired packet is differ from the data type and/or data value of corresponding OID in SNMP response information 232, standby reply control part 200 determines to Yes. If these are the same, standby reply control part 200 determines to No.

In Yes, standby reply control part 200 advances a process to Step S213.

In No, standby reply control part 200 ends SNMP response information accumulating process and advances a process to Step S206.

(Step S215)

When it is detected that the data of the acquired packet is different from the already accumulated data, standby reply control part 200 performs a response data update process.

Standby reply control part 200 updates and overwrites the data type and/or data value of SNMP response information 232 to the type and/or data value in response data 132 of the acquired packet.

(Step S216)

Then, standby reply control part 200 performs changing information setting process.

Standby reply control part 200 changes to values, such as "1" or the like, which indicates updating (changing,) to the entry of changing information 233 corresponding to OID of the acquired packet.

By such a process, in the entry of changing information 233 for performing the SNMP proxy response, the entry detected changing is set to "1," and the others remains to set to "0," or the like.

By the above-mentioned, the SNMP response information accumulating process in the normal mode is ended, and a process is advanced to Step S206.

Figure 7:
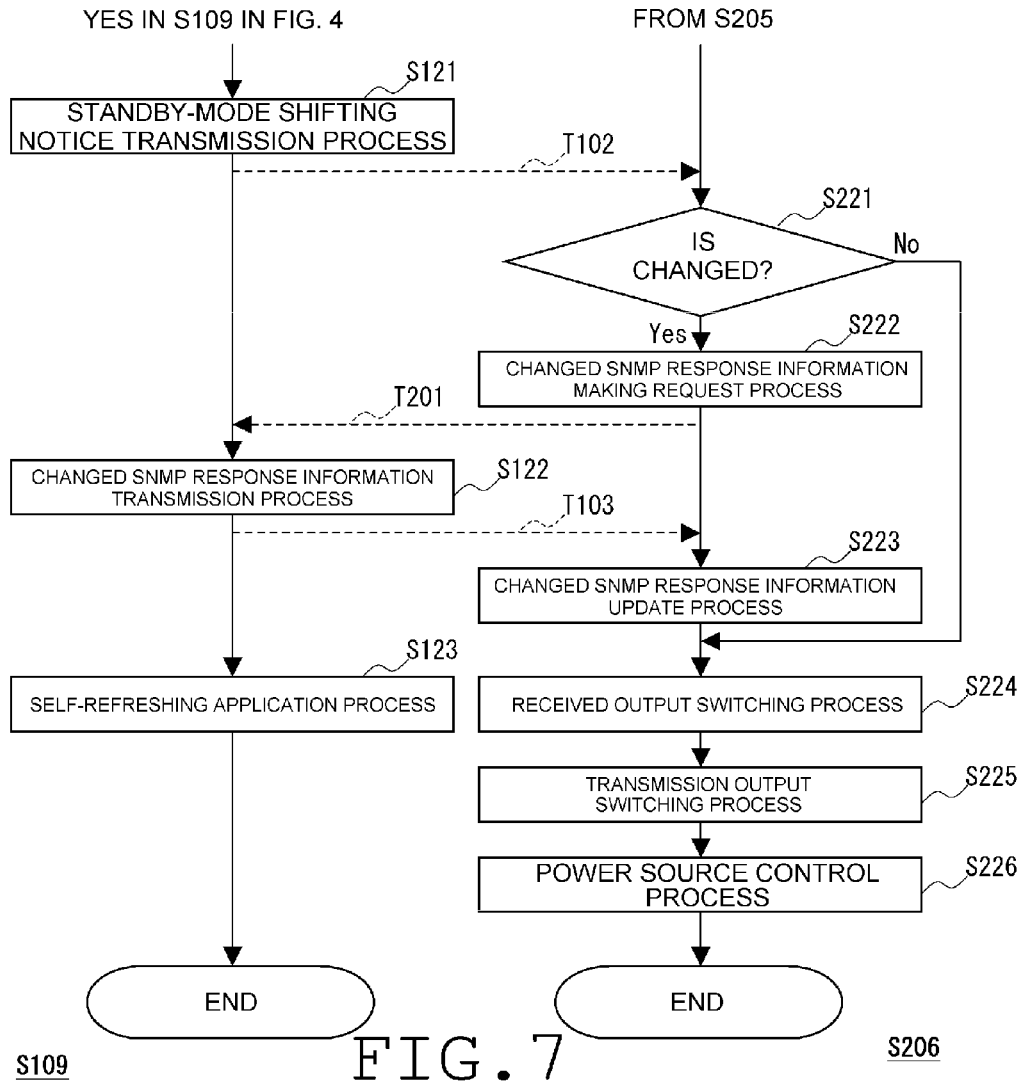
FIG. 7 is a flow chart that illustrates details of the standby mode shifting process and standby mode standby response start process shown in FIG. 4.
Figure 8:
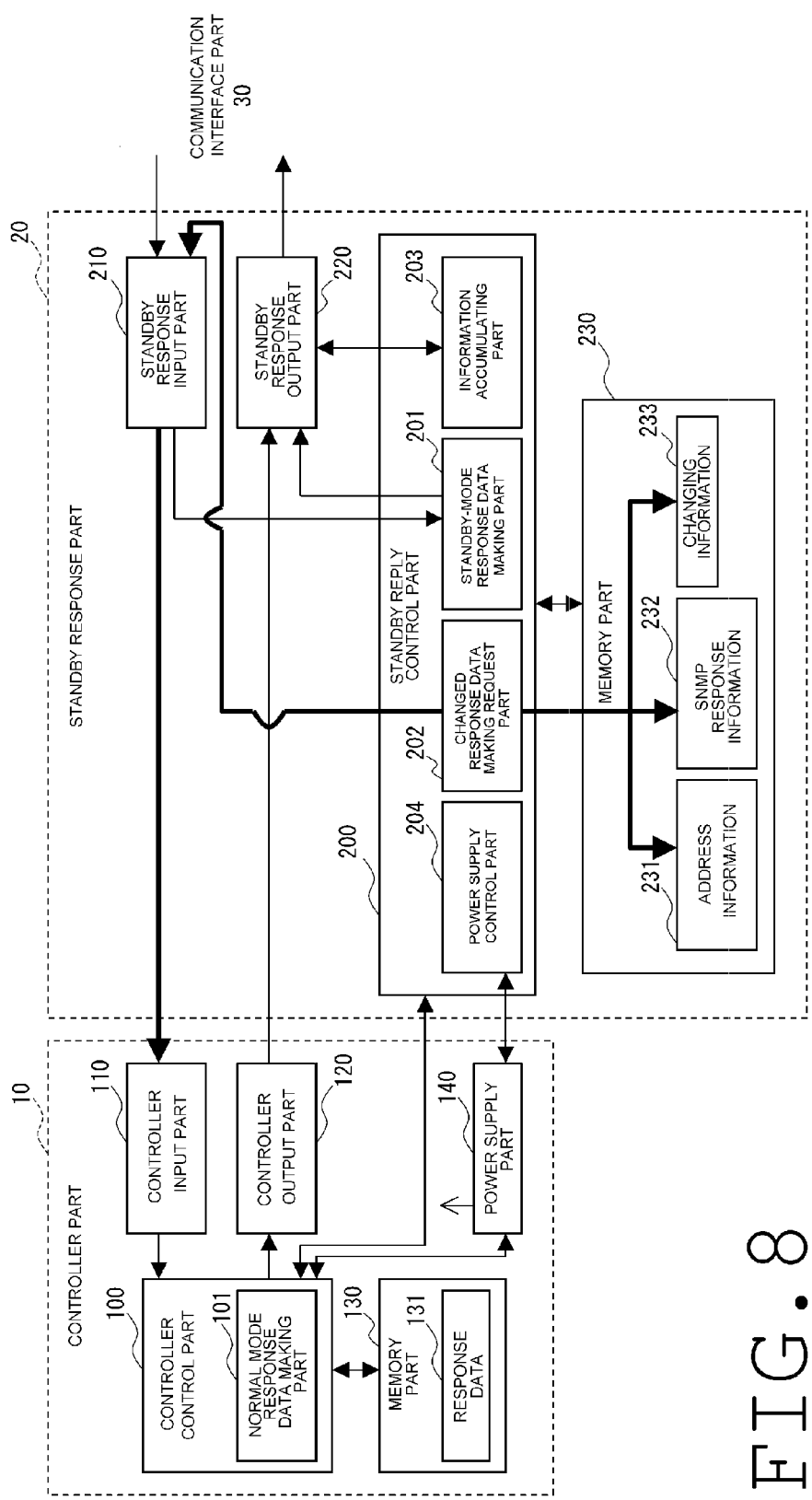
FIG. 8 is a conceptual diagram of changed SNMP response information acquisition request process shown in FIG. 7.

Then, referring to FIG. 7 and FIG. 8, the details of the standby mode shifting process of Step S109 in FIG. 4 and the standby mode standby response start process of Step S206 in FIG. 4 are explained.

(Step S121)

Firstly, controller control part 100 performs a standby mode shifting notice transmission process.

Controller control part 100 transmits the standby mode shifting notice that indicates shifting to a standby mode to standby reply control part 200 in standby response part 20 (timing T102.)

(Step S221)

Here, standby reply control part 200 in standby response part 20 that received the standby mode shifting notice determines whether or not the data of SNMP response information 232 is changed. Standby reply control part 200 reads changing information 233, and if there is an entry of values, such as "1," or the like, which indicates updating, it determines to Yes. If the other case, standby reply control part 200 determines to No.

In Yes, standby reply control part 200 advances a process to Step S222.

In No, standby reply control part 200 advances a process to Step S224.

(Step S222)

If the data of SNMP response information 232 is changed, standby reply control part 200 performs a changed SNMP response information making request process.

According to FIG. 8, standby reply control part 200 making requests to controller part 10 the newest data of OID corresponding to the entry set the value, such as "1," or the like, which indicates changing, in changing information 233. In detail, for example, standby reply control part 200 makes information request data 131 including the packet of a SNMP-Get request and makes input to standby response input part 210, recursively (timing T201.)

(Step S122)

Here, controller control part 100 in controller part 10 that receives information request data 131 including the packet of the SNMP-Get request performs a changed SNMP response information transmission process.

Controller control part 100 makes and transmits a packet in which response data 132 of the newest equipment state corresponding to OID of the packet received by controller input part 110 is included (timing T103.)

Controller control part 100 performs this process similarly to Step S103-Step S107 in FIG. 4.

(Step S223)

Here, standby reply control part 200 in standby response part 20 that receives the packet in which the newest response data 132 is included performs a changed SNMP response information update process.

Standby reply control part 200 writes and updates data of response data 132 in the corresponding data of OID in SNMP response information 232. Standby reply control part 200 is performed this process similarly to the response data update process at Step S215 shown in FIG. 4.

By these processes, in the timing that shifts from the normal mode to the standby mode, a recursive SNMP request is performed for a SNMP response data detected changing, and SNMP response information 232 can be updated. Data based on such response data 132 in which detects changing has a possibility of changing after that is high because of changing by an equipment state. Accordingly, the latest response data 132 just before controller part 10 becomes the standby mode is making requested recursively, SNMP response information 232 is updated by made response data 132, and a response with a suitable response data 132 becomes possible in the standby mode. That is, the compatibility of response data 132 can be kept between the normal mode and the standby mode.

In addition, standby reply control part 200 may use OID under SNMP response acquired just before and transmits a GetNext request in a plurality of times, and all the sub-branch of the tree of SNMP response information 232 may be updated.

(Step S123)

Here, controller control part 100 in controller part 10 performs a self-refreshing application process.

Controller control part 100 may store various states, or the like, in recording media, such as HDD or a flash memory, in memory part 130.

In addition, controller control part 100 may control to be carried out this self-refreshing application process after completing the process about all the entries of changing information 233 for the changed SNMP response information update process by standby response part 20.

Then, when controller control part 100 does not access for a specified period, RAM in memory part 130 is in the state of self refreshing.

By the above-mentioned, the standby mode shifting process of controller part 10 is ended.

(Step S224)

Here, standby reply control part 200 in standby response part 20 that receives the standby mode shifting notice performs a received output switching process.

Standby reply control part 200 switches output of standby response input part 210 to standby mode response data making part 201.

(Step S225)

Next, standby reply control part 200 performs a transmission output switching process.

Standby reply control part 200 switches output of standby response output part 220 to both transmitting part 320 in communication interface part 30 and standby mode response data making part 201 in standby reply control part 200.

(Step S226)

Then, standby reply control part 200 performs source control process.

Standby reply control part 200 transmits a standby mode shifting command to power supply part 140 in controller part 10 and turns OFF electrical power application.

Also, standby reply control part 200 reads the control program for executing in the standby mode from HDD, a flash memory, or the like, to RAM in memory part 230 and starts execution of the standby mode process that explains below.

By the above-mentioned, the standby mode standby response start process in standby response part 20 is ended.

[A Standby-Mode Process in Responding Apparatus 1]

Figure 9:
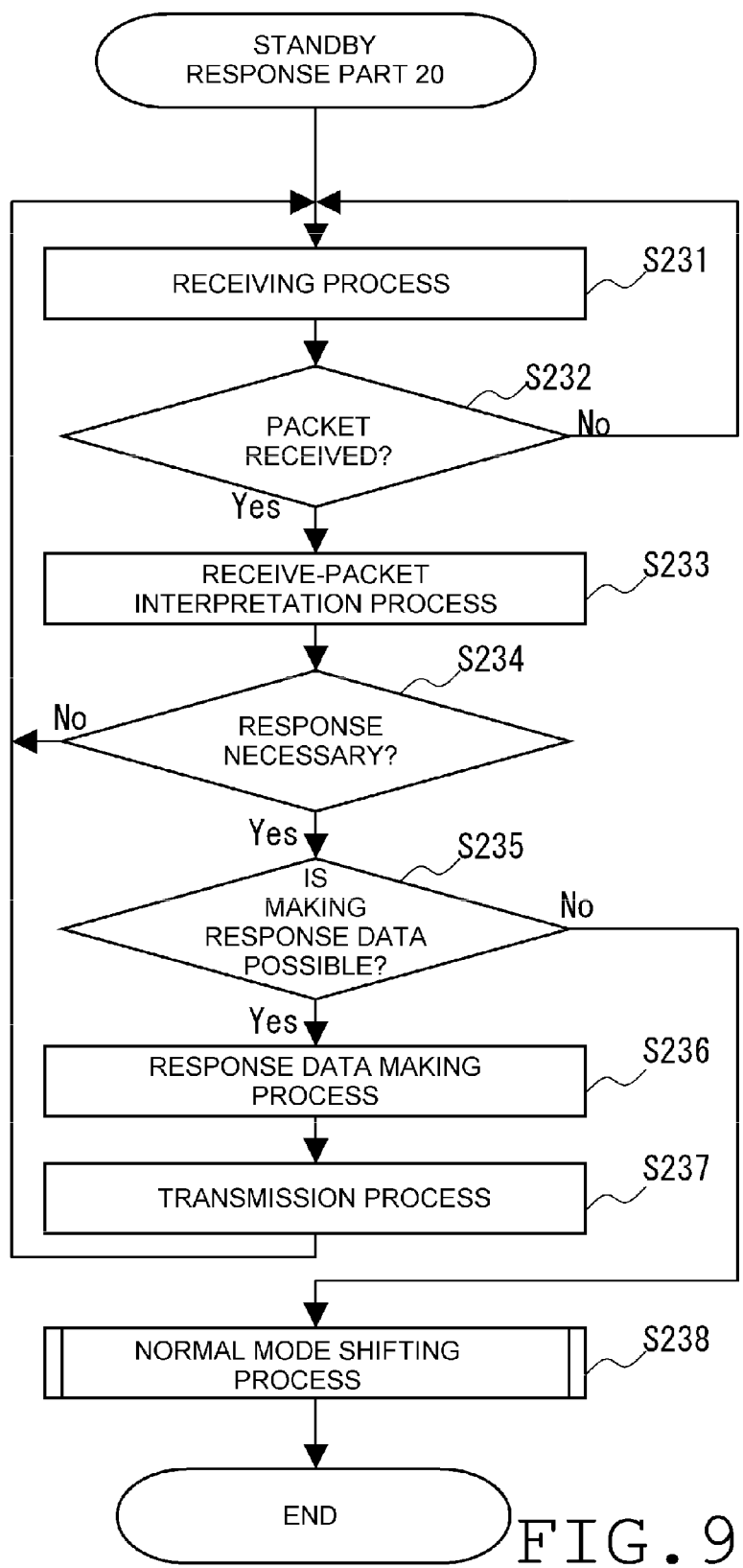
FIG. 9 is a flow chart of standby mode process of the responding apparatus related to the embodiment of the present disclosure.
Figure 10:
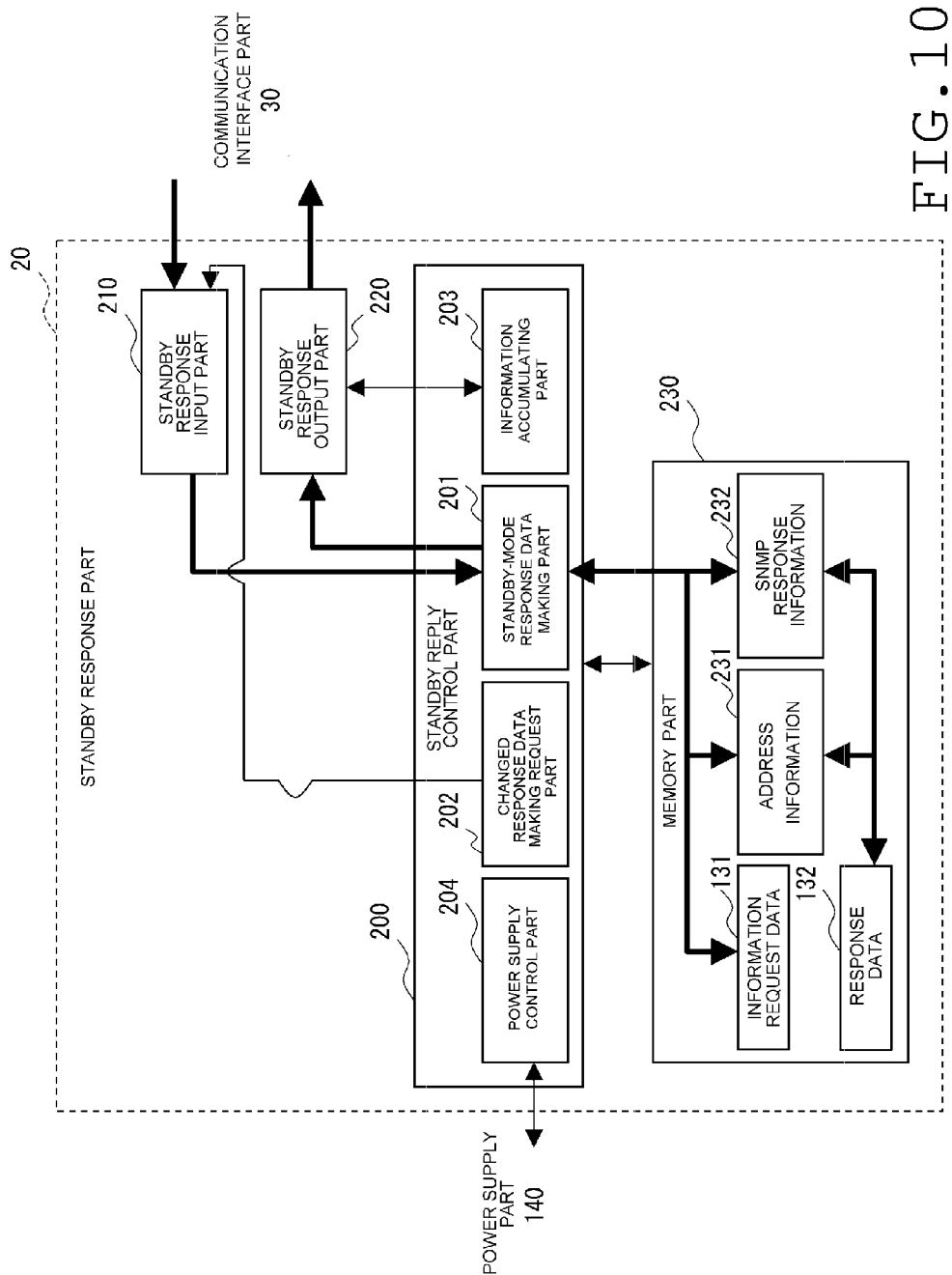
FIG. 10 is a conceptual diagram of the response data generation process shown in FIG. 9.

Next, with reference to FIG. 9-FIG. 10, the standby mode process in responding apparatus 1 related to the embodiment of the present disclosure is explained.

In the standby mode process of the present embodiment is, in the standby mode, standby response part 20 responds by making response data 132 by using address information 231 and SNMP response information 232 memorized in memory part 230 by information accumulating part 203. In this case, standby response part 20 uses SNMP response information 232, which is made as corresponded to the making request recursively output by changed response data making request part 202 at the time of shifting to the standby mode. Thereby, SNMP response information 232 just before shifting from the normal mode to the standby mode is used, and a response having compatibility can be performed even in the standby mode. Also, standby response part 20, if there is a packet that response is impossible, controller part 10 is returned to the normal mode and corresponds.

In the standby mode process of the present embodiment, mainly, standby reply control part 200 of standby response part collaborates with each part and executes the program memorized in memory part 230 by using hardware resources.

In the following, with reference to the flowchart of FIG. 9, the details of a standby mode process are explained for each step.

(Step S231)

Firstly, standby reply control part 200 in standby response part 20 as standby mode response data making part 201 performs a receiving process.

According to FIG. 10, firstly, when a packet is received from network 5 in receiving part 310, the received packet is input to standby response input part 210. This input packet is input into standby mode response data making part 201 in standby reply control part 200.

(Step S232)

Then, standby reply control part 200 as standby mode response data making part 201 determines whether or not there is any received packet. If there is a received packet, standby reply control part 200 determines to Yes. If the other case, standby reply control part 200 determines to No.

In Yes, standby reply control part 200 advances a process to Step S233.

In No, standby reply control part 200 returns a process to Step S231, and it waits until receiving a packet.

(Step S233)

When there is a received packet, standby reply control part 200 as standby mode response data making part 201 performs a receive-packet interpretation process.

Standby reply control part 200 analyzes, by a protocol of the received packet, information of the transmission destination, or the like, whether a response is needed by responding apparatus 1, in that case, is able to respond by standby response part 20, or is needed the response by controller part 10.

Also, if the received packet is information request data 131, standby reply control part 200 memorizes it in memory part 230, temporarily.

(Step S234)

Then, standby reply control part 200 as standby mode response data making part 201 determines whether or not response data 132 is needed to make. If it is a packet to be responded by responding apparatus 1, standby reply control part 200 determines to Yes. If the other cases, standby reply control part 200 determines to No.

In Yes, standby reply control part 200 advances a process to Step S235.

In No, standby reply control part 200 returns a process to Step S231 and continues to receive a packet.

(Step S235)

If it is a packet to be responded, standby reply control part 200 as standby mode response data making part 201 determines whether or not making of response data 132 is possible. Standby reply control part 200 refers to memory part 230, and if response data 132 can be made by address information 231 and SNMP response information 232, it determines to Yes. If response data 132 cannot be made, standby reply control part 200 determines to No. As an example of the case being not to make the response data 132, it enumerates cases that the IP address and the MAC Address are not memorized in address information 231, the sufficient data of SNMP response information 232 is lacked, they are neither ARP nor an SNMP packet, or the like.

In Yes, standby reply control part 200 advances a process to Step S236.

In No, standby reply control part 200 advances a process to Step S238.

(Step S236)

If making of response data 132 is possible, standby reply control part 200 as standby mode response data making part 201 performs a response data making process.

Referring to FIG. 10, standby reply control part 200 makes a packet of response data 132 for a response corresponding to the received packet based on the data accumulated in address information 231 and SNMP response information 232 and stores it in memory part 230, temporarily.

(Step S237)

Then, standby reply control part 200 as standby mode response data making part 201 performs a transmission process.

Standby reply control part 200 outputs the packet to transmit as response data 132, which is input from standby mode response data making part 201, to standby response output part 220 in communication interface part 30.

This packet to transmit is transmitted to network 5 from transmitting part 320.

(Step S238)

If response data 132 cannot be made in spite of a necessary to respond, standby reply control part 200 as power supply control part 204 performs normal mode shifting process.

Standby reply control part 200 returns controller part 10 for making response data 132.

The details of this normal mode shifting process are described later.

By the above-mentioned, the standby mode process of the present embodiment is ended.

Next, FIG. 11 explains the details of the normal mode shifting process at Step S238 in FIG. 9.

(Step S241)

If No in Step S235 in FIG. 9, at first, standby reply control part 200 performs a turn ON process.

Standby reply control part 200 turns ON the power supply of controller part 10 via power supply control part 204.

(Step S242)

Then, standby reply control part 200 performs controller control part return process.

Standby reply control part 200 resets, or the like, controller control part 100.

Thereby, when controller control part 100 accesses memory part 130, a self-refreshing state is canceled.

Controller control part 100 may return to RAM in a memory part, or the like, the various state, or the like, stored in recording media, such as HDD, or a flash memory, at Step S121 in FIG. 7.

(Step S243)

Then, standby reply control part 200 performs a received output switching process.

Standby reply control part 200 switches the output of standby response input part 210 from standby mode response data making part 201 to controller input part 110 in controller part 10.

(Step S244)

Then, standby reply control part 200 performs a transmission output switching process.

Standby reply control part 200 switches output of standby response output part 220 from both transmitting part 320 in communication interface part 30 and information accumulating part 203 in standby reply control part 200 to transmitting part 320 and information accumulating part 203.

Above-mentioned, the normal mode shifting process is ended.

The following effects can be acquired with configuring as mentioned above.

The information of the newest response data by the side of main CPU may be changed by equipment states. Accordingly, in a typical case, the information of the response data accumulated in the side of sub CPU in the normal mode differs from the information of the newest response data in the side of main CPU, and it may be unable to have the compatibility of the response in the normal mode and in the standby mode.

As compared with this, responding apparatus 1 related to the embodiment of the present disclosure, in the normal mode and in the standby mode, information request data 131 from network 5 is received, it has an ability ready for sending about response data 132 to information request data 131 in network 5, normal mode response data making part 101 that makes response data 132 in the normal mode; information accumulating part 203 that accumulates, in the normal mode, information of response data 132 made by normal mode response data making part 101 as address information 231 and SNMP response information 232 in memory part 230 that can be read in the standby mode, and when the information of response data 132 is changed by normal mode response data making part 101, changes address information 231 and SNMP response information 232 by using the information of the response data 132, and sets changing information 233 associated with the address information 231 and SNMP response information 232 in memory part 230; changed response data making request part 202 that, when shifting from the normal mode to the standby mode, refers the changing information 233 accumulated by information accumulating part 203 and makes information request data 131 for making requests information of changed address information 231 and SNMP response information 232 to normal mode response data making part 101; and standby-mode response data making part 201 that makes response data 132 in the standby mode with address information 231 and SNMP response information 232 made corresponding to the making request of changed response data making request part 202 and address information 231 and SNMP response information 232 accumulated in the memory part by the information accumulating part.

As configured in this way, about SNMP response information 232 that is information of response data 132 accumulated in the normal mode at the side of standby response part 20, the packet that controller part 10 transmits is monitored and an update is checked. For detecting an update, a SNMP-Get request is transmitted from standby response part 20 to controller part 10 in the timing just before shifting to standby mode, the response data 132 is acquired, and an update is performed. Namely, when shifting from the normal mode to the standby mode, response data 132 corresponding to changing information 233 is making requested, recursively, and it can re-accumulate in SNMP response information 232. Thereby, incompatibility of response data 132 in controller part 10 and response data 132 in standby response part 20 can be prevented. That is, a responding apparatus that maintains the compatibility of response data 132 and responds in the time of the response in the normal mode and the standby mode can be provided.

Also, as configured in this way, information for making response data 132 in the standby mode is accumulated in the normal mode, it does not need to transmit the information accumulated in the standby mode, response data 132 can be made by using the accumulated information.

That is, the information for making response data 132 in the standby mode can be accumulated in memory part 230 in the normal mode. Accordingly, in the shifting to a standby mode from normal mode, it becomes unnecessary to transmit data to standby response part 20 from controller part 10 one by one, and can accelerate the shifting to a standby mode from normal mode conventionally.

Also, by referring to changing information 233 at the time of shifting to the standby mode, since only changed SNMP response information 232 is re-accumulated, shifting to the standby mode can be performed in a short time.

Responding apparatus 1 related to the embodiment of also, the present disclosure acquires an own transmission packet by the standby response part 20 side in the normal mode, extracts and memorizes information needed for the response in the standby mode, and performs a network response using the information accumulated in the standby mode. That is, the packet that it passes through the packet received from communication interface part 30 controller part 10 at the time, and controller part 10 transmits usually transmits standby response part 20 in responding apparatus 1 of the present embodiment to communication interface part 30. At that time, when the transmission packet is checked and information needed for the response in the standby is accumulated.

Accordingly, a setup of the special response to standby response part 20 becomes unnecessary, and it can expect number-of-processes reduction of controller parts 10.

Also, according to responding apparatus 1 of the present embodiment, since standby response part 20 recursively transmits a packet to controller part 10, response data 132 in the standby mode is collectable.

Thereby, the data for responding in the time of standby is automatically accumulated into standby response part 20, and response data 132 in the standby mode can also be made in a short time. Accordingly, after shifting to the standby mode, a possibility to make needed response data 132 by SNMP response information 232 can be improved. Thus, a possibility of Napping a case where response data 132 cannot be made at the time of the shifting from the normal mode to the standby mode in the first time and controller part 10 must be returned immediately can be lowered. Therefore, reduction of power consumption is expected.

Also, responding apparatus 1 related to the embodiment of the present disclosure, changed response data making request part 202, when response data 132 that includes information of specific type is made by normal mode response data making part 101 as corresponded to information request data 131 from the outside, requests information of other response data 132.

As configured in this way, as a specific type of information, when the IP address and MAC Address of responding apparatus 1 are confirmed, information request data 131 and response data 132 can be accumulated immediately, for example. Thereby, when the IP address of responding apparatus 1 is confirmed, it becomes possible to accumulate MIB for the response of SNMP of response data 132, quickly. Accordingly, the frequency to returns controller part 10 from the standby mode can be reduced, and power-saving efficiency can be improved.

Also, responding apparatus 1 related to the embodiment of the present disclosure, information request data 131 is data of a request of ARP or SNMP, a specific type of information is an IP address and a MAC Address, and information request data 131 recursively-transmitted is a Get request of SNMP. Thereby, main information to be responded from a network can be accumulated in the standby mode.

Accordingly, power-saving efficiency can be improved.

In addition, in the embodiment of the present disclosure, it is explained an example that one set of terminal 2, which the SNMP manager or the like is installed, is connected to network 5. However, as shown in FIG. 1, a plurality of terminals 2 can be connected to network 5, and responding apparatus 1 can receive a packet of information request data 131 from the plurality of terminals 2.

Also, in the present embodiment, although an example for making response data 132 to ARP and SNMP as the information to accumulate by information accumulating part 203 is explained, it is not limited to this, and in case that it is data replied as a response to information request, a variety of information can be accumulated.

As configured in this way, the response other than ARP or SNMP can be performed.

Also, in the present embodiment, an example is shown that controller part 10 input information request data 131, which communication interface part 30 outputs in the normal mode via standby response part 20. However, controller part 10 is able to perform the direct input of information request data 131, which communication interface part 30 outputs, without having via standby response part 20.

As configured in this way, the processing burden of standby response part 20 in the normal mode can be reduced, and cost can be cut down.

Also, in the above-mentioned embodiment, although memory part 130 and memory part 230 are shown as a separate components, memory part 130 and memory part 230 may be configured to have the same recording medium, RAM by using the shared memory, or the like. Even in this case, controller control part 100 and standby reply control part 200 may access in separate memory space, exclusively.

As configured in this way, cost of responding apparatus 1 is reducible.

Also, the present disclosure is applicable to information processing equipment other than the image forming apparatus. That is, it may be a configuration by using a network scanner, a server that connects a separate scanner by USB, or the like.

Also, the configuration and the operation of the above-mentioned embodiment are an example, and it cannot be overemphasized that it can change suitably and can execute in the range that does not deviate from the aim of the present disclosure.

Also, the present disclosure is suitable for a responding apparatus. However, it is not limited to a responding apparatus, and it is applicable to a general apparatus that transmits response data 132 and can operate in the standby mode.

What is claimed is:

1. An image forming apparatus allowing to receive information request data from a network in a normal mode and a standby mode and to transmit a-response data for the information request data to the network, comprising:
    a controller part that has a main board, receives the information request data in the normal mode, and transmits the response data in the normal mode; and
    a standby response part that is a circuit including an ASIC, receives the information request data in the standby mode, and transmits the response data in the standby mode,
    wherein the controller part makes the response data in the normal mode,
    wherein
      the standby response part
      i) accumulates, in the normal mode, information of the response data including address information and SNMP response information made by the controller part in a memory part that can be read in the standby mode,
      ii) sets, when the information of the accumulated response data is changed, changing information associated with the change,
      iii) refers, when shifting from the normal mode to the standby mode, the changing information set in the memory part, and issues a request for making information of changed response data to the controller part the controller part, and
      iv) makes the response data in the standby mode from the information of the changed response data and the information of the response data accumulated in the memory part, and wherein:
      the standby response part accumulates, in the address information, the response data including one of an IP address and a MAC address of the image forming apparatus, if the information request data includes one of an Address Resolution Protocol (ARP) request and a Reverse Address Resolution Protocol (RARP) request;
      the standby response part accumulates, in the SNMP response information, the response data including data of a message for a response of one of an SNMP-Get response and a TRAP, which are made with referencing an Object Identifier (OID) about a Management Information Base (MIB) of the image forming apparatus, if the information request data includes a request of an SNMP; and
      the changing information includes information indicating at least one of i) whether the SNMP response information is changed and ii) whether the address information is changed.

2. The image forming apparatus according to claim 1, wherein the changing information includes a value "0" if the data corresponding to each of the OID of the SNMP response information has not been changed since a time of accumulation, and includes a value as "1" if the data corresponding to each of the OID of the SNMP response information has been changed since the time of accumulation.

3. A network responding method executed by an image forming apparatus allowing to receive information request data from a network in a normal mode and a standby mode and to transmit response data for the information request data to the network, wherein the image forming apparatus includes:

a controller part that has a main board, receives the information request data in the normal mode, and transmits the response data in the normal mode; and a standby response part that is a circuit including an ASIC, receives the information request data in the standby mode, and transmits the response data in the standby mode, the method comprising:

via the controller part,
making the response data in the normal mode; and via the standby response part,
accumulating, in the normal mode, information of the response data including address information and SNMP response information made by the controller in a memory part that can be read in the standby mode;
setting, when the information of the accumulated response data is changed, changing information associated with change;
referring, when shifting from the normal mode to the standby mode, the changing information set in the memory part;
issuing a request for making information of changed response data to the controller part; and
making the response data in the standby mode from the information of the changed response data and the information of the response data accumulated in the memory part, and wherein
the standby response part accumulates in the address information the response data including one of an IP address and a MAC address of the image forming apparatus, if the information request data includes one of an Address Resolution Protocol (ARP) request and a Reverse Address Resolution Protocol (RARP) request;
the standby response part accumulates in the SNMP response information the response data including data of a message for a response of one of an SNMP-Get response and a TRAP, which are made with referencing an Object Identifier (OID) about a Management Information Base (MIB) of the image forming apparatus, if the information request data includes a request of an SNMP; and
the changing information includes information indicating whether a change is made to at least one of i) the SNMP response information and ii) the address information.

4. The network responding method according to claim 3, wherein the changing information includes a value "0" if the data corresponding to each of the OID of the SNMP response information has not been changed since a time of accumulation, and includes a value as "1" if the data corresponding to each of the OID of the SNMP response information has been changed since the time of accumulation.

* * * * *